US006904491B2

(12) United States Patent
Waldman et al.

(10) Patent No.: US 6,904,491 B2
(45) Date of Patent: Jun. 7, 2005

(54) HYBRID DATA STORAGE SYSTEM

(75) Inventors: David A. Waldman, Concord, MA (US); Richard T. Ingwall, Newton, MA (US); M. Glenn Horner, W. Roxbury, MA (US)

(73) Assignee: Aprilis, Inc., Maynard, MA (US)

( * ) Notice: Subject to any disclaimer, the term of this patent is extended or adjusted under 35 U.S.C. 154(b) by 154 days.

(21) Appl. No.: 10/116,684

(22) Filed: Apr. 4, 2002

(65) Prior Publication Data

US 2002/0198955 A1 Dec. 26, 2002

Related U.S. Application Data

(60) Provisional application No. 60/281,245, filed on Apr. 4, 2001.

(51) Int. Cl.[7] .............................................. G06F 12/00
(52) U.S. Cl. ..................... 711/101; 711/111; 711/115; 711/117; 711/154; 365/216
(58) Field of Search .............................. 711/101, 111, 711/115, 117, 154; 365/216

(56) References Cited

U.S. PATENT DOCUMENTS

| | | | | |
|---|---|---|---|---|
| 4,094,011 A | | 6/1978 | Nagao | |
| 5,039,182 A | * | 8/1991 | Dube et al. | 359/7 |
| 5,481,523 A | | 1/1996 | Dewald | |
| 5,519,517 A | | 5/1996 | Redfield et al. | |
| 5,625,615 A | * | 4/1997 | Dente et al. | 369/47.38 |
| 5,974,066 A | * | 10/1999 | Wu et al. | 372/43 |
| 6,023,709 A | | 2/2000 | Anglin et al. | |
| 6,199,146 B1 | | 3/2001 | Pence | |
| 6,212,148 B1 | | 4/2001 | Hesselink et al. | |
| 6,348,983 B1 | | 2/2002 | Curtis et al. | |
| 6,349,350 B1 | * | 2/2002 | Hathorn et al. | 710/36 |
| 2001/0052061 A1 | * | 12/2001 | Fradette | 711/202 |
| 2002/0087783 A1 | * | 7/2002 | Leonhardt et al. | 711/111 |

OTHER PUBLICATIONS

PCT Intl Search Report for International Application PCT/US02/10769 dated Jun. 9, 2002. (Submitted by Applicant).*
Ashley et al., "Holographic Data Storage," IBM J. Res. Develop., vol. 44, No. 3, pp 341–368, May 2000.*
Psaltis et al., "Holographic Data Storage," pp 52–60, IEEE, Feb. 1998.*
Denz et al., "Volume Holographic Storage Demonstrator Based on Phase–Coded Multiplexing," pp 832–839, IEEE, Oct. 1998.*
Barbastathis, G. et al., "Volume Holographic Multiplexing Methods," *Library of Congress Cataloging–in–Publication Data*, pp. 21–62, Oct. 24, 2000.
Kogelnik, Herwig, "Coupled Wave Theory for Thick Hologram Gratings," *The Bell System Technical Journal*, 48(9) :2909–2947 (1969).
Orlov, Sergei S., "Volume Holographic Data Storage," *Communications of the ACM*, 43(11) :46–54, Nov. 2000.

* cited by examiner

*Primary Examiner*—Stephen Elmore
(74) *Attorney, Agent, or Firm*—Hamilton, Brook, Smith & Reynolds, P.C.

(57) ABSTRACT

A hybrid data storage system comprising at least one memory system and at least one holographic drive, data being transmitted between the holographic drive and the memory system. At least one holographic drive writes data to a first holographic recording medium, and reads the written data from said first recording medium and from at least one other holographic recording medium.

60 Claims, 6 Drawing Sheets

HYBRID DATA STORAGE SYSTEM

RELATED APPLICATION

This application is claims the benefit of U.S. Provisional Application No. 60/281,245, filed Apr. 4, 2001, the entire teachings of which are incorporated herein by reference.

BACKGROUND

Certain digital data storage applications require storing a large amount of data in an archival storage system. Magnetic disk drives are sometimes used to store the data, for instance, in applications that require the capability of both writing and reading the data. However, in some applications, the volume of data is so immense that the use of magnetic disk drives may be uneconomical, in particular, when the data is suitable for write once data storage applications. Therefore, when a certain application requires storage of a large amount of data, magnetic tape drives have been used in combination with removable tape media. But the data transfer rate to and from the magnetic tape drives is typically significantly lower than that of magnetic disk drives and random access is lacking. Consequently, some systems use optical data storage devices, in combination with removable media, which are quite suitable for write-once-read-many (WORM) data storage applications. The rate of data transfer of optical data storage devices, however, is typically much lower than that of either magnetic disk drives or magnetic tape drives.

Such data storage systems have been accepted in the industry, and they are presumably considered to perform reasonably well for their intended purpose. However, they are not without their shortcomings. For instance, in some applications it is desirable to be able to read/write many times to a memory device and then to transfer this data to an optical storage device, which can improve the archival nature of the stored information.

SUMMARY

The present invention, implements a hybrid data storage system. The data storage system includes a memory device that transfers information, that by way of example, is text, image, or voice data, or combinations thereof, to a read/write holographic drive engine. The read/write holographic drive engine writes data, represented as volume holograms, into, for example, a holographic recording medium such as a holographic recording disk or a holographic recording card, or any other holographic recording medium with a suitable geometry.

Once the medium is completed, that is, no additional data is to be written to the medium, it can be transferred to a read only holographic drive engine which provides access to the data for a client through, for example, a wide area network (WAN), a local area network (LAN), an online storage system or a network attached storage system or storage area network, a near-online storage system, and/or an offline storage system. Similarly, either before or after the medium is completed, the data can be transferred from the read/write holographic drive engine to the client through, for example, the WAN, LAN, the online storage system or the network attached storage system or storage area network, the near-online storage system, and/or the offline storage system.

Embodiments of this aspect of the invention may include one or more of the following features. The system includes one or more data buffers that interface the memory device with the read/write holographic drive engine to facilitate transferring the data from the memory system to the read/write drive engine. The system can include one or more cache devices which substantially optimize access of data, by client components, such as those that may be part of the hybrid storage system, or devices that may be external to the hybrid storage system. The buffers and the cache devices may be stand-alone units, or they may reside in either the memory device or the read/write drive engine, or in both devices.

The memory device can be one or more magnetic disk drives. Additionally, or alternatively, the memory device can be one or more semiconductor memory devices, or any other suitable device, such as magneto-optical storage devices or magnetic or optical tape devices.

In some embodiments, the system includes a controller that may comprise a CPU, which provides operating instructions for the hybrid data storage system and may provide an interface between the hybrid data storage system and a WAN, at least one LAN, other storage systems, other memory systems, or combinations thereof.

The hybrid data storage system can receive the information through an interface to a wide area network (WAN) or one or more local area networks (LAN) that can also be a dedicated LAN or campus wide network (CAN). Additionally or alternatively, the hybrid data storage system can distribute information through the interface to the WAN or one or more LANs that can also be a dedicated LAN or campus wide network (CAN). The interface can be a network adapter that additionally may serve as an adapter for optical communications carried along optical fiber, through space, or using integrated optics, or combinations thereof, for wireless communications, and by way of example can communicate with Wide Area Network, Local Area Network, Campus Wide Network, online storage, near online storage, offline storage, network-attached storage or storage attached network (SAN) using such protocols as IDE, SCSI, Fiber Channel, Firewire, GPIB, SDSL, ADSL, HDSL, ISDN, ISDN PRI, DS1, DS3, ATM, X10, T1, T3, Frame Relay, Token Ring, LATA, OCxx, STS-x, SONET, CDDI, FDDI and the like, or memory system or cache or combinations thereof.

Some embodiments of this aspect include a light-tight storage device and a non-light-tight storage device for storing holographic recording media. The system can include one or more transfer mechanisms to transfer the holographic recording media between the storage devices, the read/write holographic drive engine, and the read only holographic drive engine.

In another aspect of the invention, a hybrid data storage device includes at least one memory system, and at least one holographic memory system drive engine that receives data from the memory system.

In yet another general aspect of the invention, a hybrid data storage system includes a controller that receives information from an outside source of information, and a holographic drive engine. The information is transmitted between the holographic drive engine and the controller.

Embodiments of this aspect of the invention can include one or more of the following features. The outside source of information can be an on-line storage or a near-on-line storage or an off-line storage or a network attached storage system (NAS) or a storage attached network (SAN) or an enterprise storage system or other memory systems or devices having stored information, or combinations thereof.

The hybrid data storage system can receive the information through an interface to a wide area network (WAN) or one or more local area networks (LAN) that can also be a dedicated LAN or campus wide network (CAN). Additionally or alternatively, the hybrid data storage system can distribute information through the interface to the WAN or one or more LANs that can also be a dedicated LAN or campus wide network (CAN). The interface can be a network adapter that additionally may serve as an adapter for optical communications carried along optical fiber, through space, or using integrated optics, or combinations thereof, for wireless communications, and by way of example can communicate with protocols for IDE, SCSI, Fiber Channel, Firewire, GPIB, IEEE, SDSL, ADSL, HDSL, ISDN, ISDN PRI, DS1, DS3, ATM, X10, T1, T3, Frame Relay, Token Ring, LATA, OCxx, STS-x, SONET, CDDI, FDDI, and the like, or memory system or cache or combinations thereof.

Related aspects of the invention include methods of storing data with hybrid data storage systems.

Among other advantages, a particular embodiment of the data storage system implements the memory device, the read/write holographic drive engine, the read only holographic drive engine, and the media storage devices as separate modular units such that these units can operate independently of each other and with each other. For example, the memory device can transfer data to the read/write holographic drive engine that writes the data to a disk, while the read only holographic drive engine reads data from another disk and provides this information to a client.

Still other aspects, features and advantages follow.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
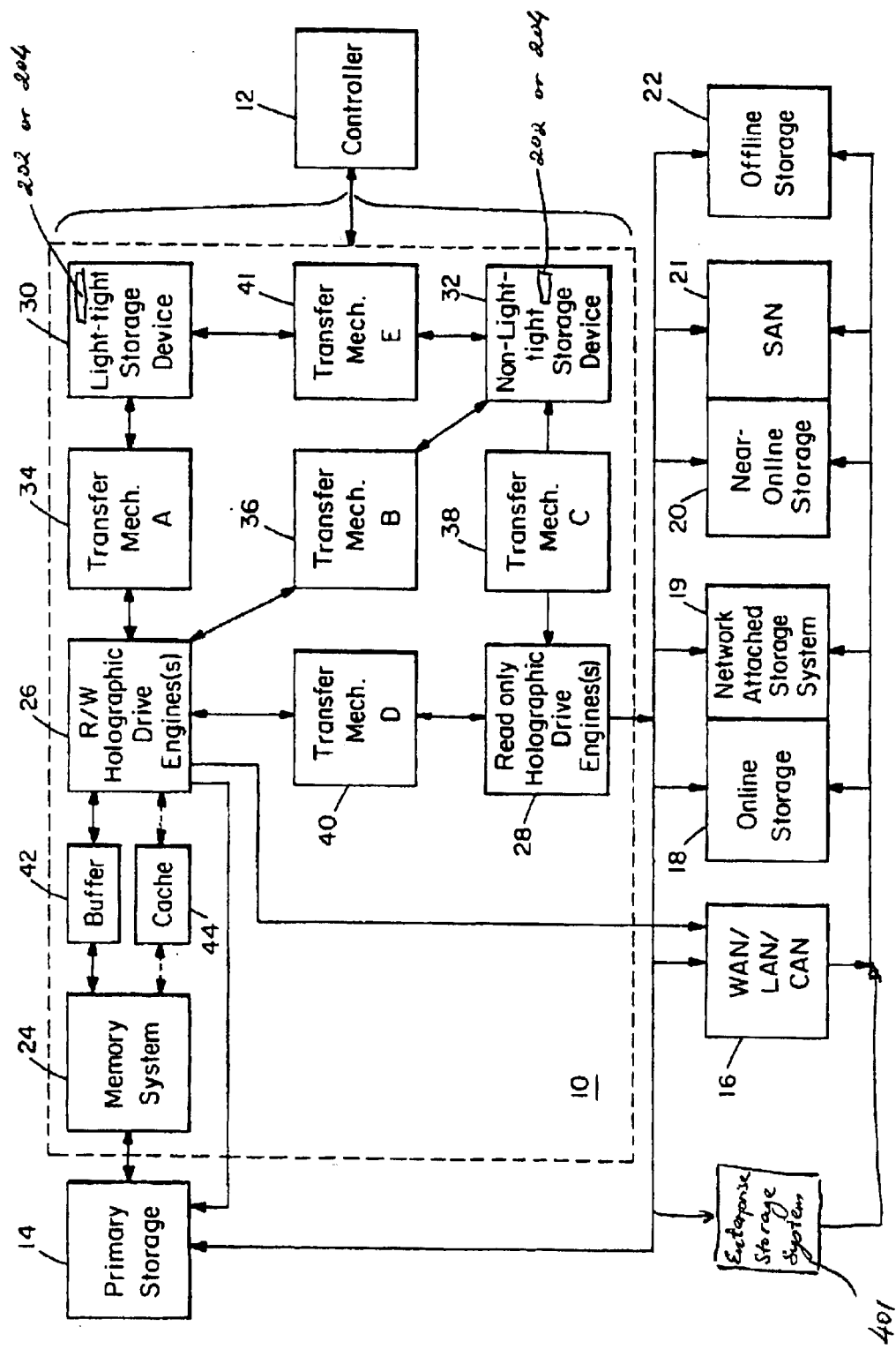
FIG. 1 is a block diagram of a hybrid data storage system in accordance with the present invention.
Figure 1B:
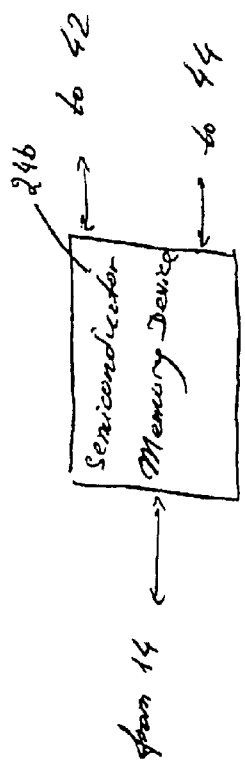
FIGS. 1A–1D depict alternative embodiments of memory system 24 shown on FIG. 1.
Figure 1D:
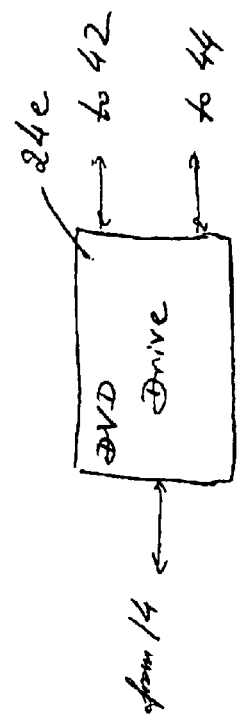
Figure 1A:
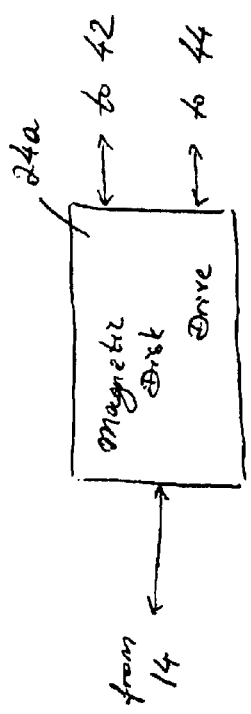
Figure 1C:
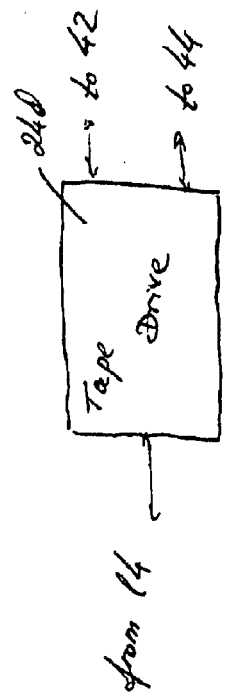

The hybrid data storage system of the present invention is illustrated generally at 10 in FIG. 1. Upon instructions from a controller 12, the hybrid data storage system 10 receives digital data, which can be text, images, or voice, or combinations thereof, from a primary storage system 14, stores the data, and then communicates the data information back to the primary storage system 14 or, for example, to one or more client devices attached to a wide area network (WAN) 16, at least one local area network (LAN) 16 that can also be a dedicated LAN or campus area network (CAN), an online storage system 18 or a network attached storage system 19, a near-online storage 20, a storage area network (SAN) 21, and/or an offline storage system 22. Additionally or alternatively, the WAN 16 or LAN 16 may transfer the data to the online storage system 18, the network attached storage system 19, the SAN 21, the near-online storage system 20, and/or the offline storage system 22.

The hybrid data storage system 10 includes a memory system 24 that directly receives data from the primary storage system 14 and transfers the data to one or more read/write (R/W) holographic drive engines 26. Read/write holographic drive engines are described in detail in Communications of the ACM, November 2000/Vol. 43, No. 11, pp. 45–54, the entire contents of which are incorporated herein by reference, and in U.S. Pat. No. 5,481,523 to Dewald, the entire contents of which are incorporated herein by reference. The memory system 24 can be one or more magnetic disk drives, semiconductor memory devices, such as integrated chips, or magneto-optical devices, or any other suitable memory device. The hybrid data storage system is also provided with one or more read only holographic drive engines 28, described in detail in U.S. Pat. No. 5,481,523, a light-tight storage device 30, a storage device 32, and a set of transfer mechanisms -A, -B, -C, -D, and -E identified as 34, 36, 38, 40, and 41 respectively, which transfers holographic recording media between the read/write holographic drive engine 26, the read only holographic drive engine 28, the light-tight storage device 30, and the storage device 32. The light-tight storage device 30 and the storage device 32 may be a cartridge containing the holographic medium. The storage device 32 can, in one embodiment, be a light-tight storage device and, in another embodiment, a non-light-tight storage device. A non-light-tight embodiment is preferred. The transfer mechanisms, 34, 36, 38, 40, 41, may be five independent stand-alone units, or alternatively, a single transfer mechanism can be employed to provide the transfer functions amongst the read/write holographic drive engine 26, the read only holographic drive engine 28, the light-tight storage device 30, and the non-light-tight storage device 32.

The hybrid data storage system 10 also includes one or more data buffers 42 that can interface the memory system 24 to the read/write holographic drive engine 26. The data buffers 42 receive the data from the memory system 24 and then facilitate the process of transferring the data to the read/write holographic drive engine 26, which includes altering the format of the data, if needed, to make it suitably readable for the read/write holographic drive engine 26. The data buffers 42 may be separate physical units, or they may be logical structures in either the memory system 24 or the read/write holographic drive engine 26, or in both devices.

In the embodiment of the invention shown in FIG. 1, one or more cache devices 44 are used in parallel with the data buffers 42 to improve or substantially optimize access by storage elements, such as those that are part of the hybrid storage system, or by client devices to the hybrid storage system. As with the data buffers 42, the caches may be either separate physical units, or they may be logical units in either the memory system 24 or the read/write holographic drive engine 26, or both the read/write holographic drive engine 26 and the memory system 24 can include one or more cache devices.

The cache devices 44, independently or in conjunction with the data buffers 42, substantially optimize access of data, in a particularly useful format, if needed, to or from the read/write holographic drive engine 26. That is, the cache devices 44 facilitate transferring the data to the read/write holographic drive engine 26 by maintaining data transfer at a rate at which the read/write holographic drive engine 26 is capable of reading and writing to a holographic recording medium in a particularly useful manner.

The hybrid data storage system 10 is able to accommodate different types of holographic recording media. For instance, the holographic recording medium may be a disk, in which case, the read/write holographic drive engine 26 and the read only drive engine 28 consist of one or more holographic disk drives. When disks are used, the read/write holographic drive engine 26 writes digital holograms on one or more tracks of the disk. The tracks refer to the arrangement of areas of holographic recording in concentric paths, helical paths, or other suitable paths, about the disk such that areas of recording can be abutting, separated, or partially overlapped along the path, or fully overlapped within regions of the path such that the regions can be abutting, separated, or partially overlapped along the path, or combinations thereof. In addition, the arrangement of tracks can be abutting, separated, or partially overlapped, or combinations thereof. The disks can be stored, for example, in a jukebox arrangement in the light-tight storage 30, which may include one or more cartridges, and the non-light-tight storage device 32, which also may include one or more cartridges.

In addition to disks, other holographic recording media contemplated include media such as cards, which may be arranged in stacks or other configurations, or other useful geometries. When card stacks are employed, the data would be recorded along rows and/or columns of the card rather than about concentric or helical tracks as with holographic recording disks, such that areas of recording can be abutting, separated, or partially overlapped along the rows or columns, or fully overlapped within regions of the rows and/or columns such that these regions can be abutting, separated, or partially overlapped along the rows and/or columns, or combinations thereof. The arrangement of rows and/or columns themselves can be abutting, separated, or partially overlapped, or combinations thereof as well. If the card is intended to be rotated then the areas of holographic recording may be in concentric paths, helical paths, or other suitable paths, about the card such that areas of recording can be abutting, separated, or partially overlapped along the path, or fully overlapped within regions of the path such that the regions can be abutting, separated, or partially overlapped along the path, or combinations thereof. Similarly, the arrangement of tracks can be abutting, separated, or partially overlapped, or combinations thereof.

Figure 2:
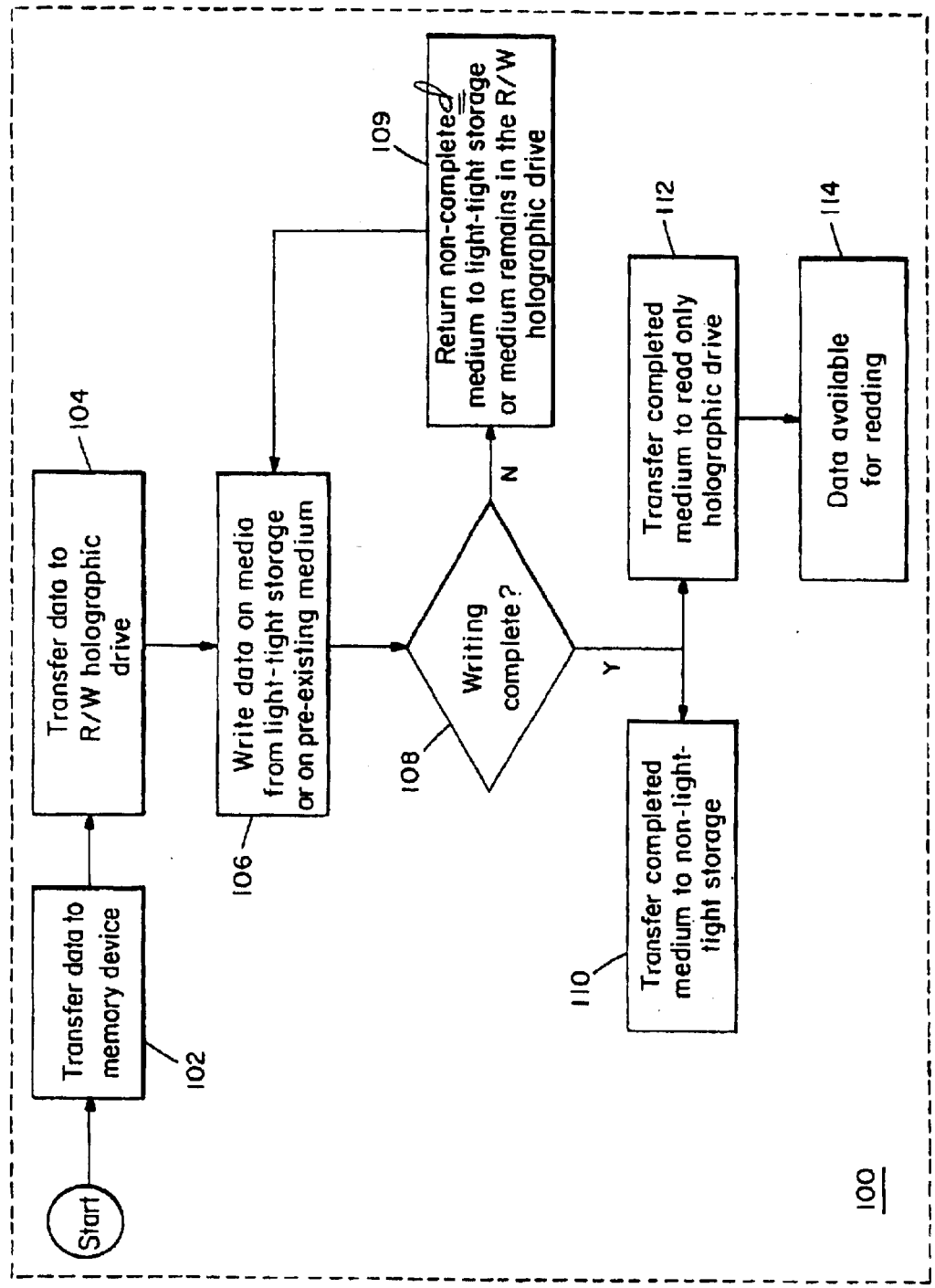
FIG. 2 is a flow diagram of a sequence of steps performed by the hybrid data storage system of FIG. 1.

Referring now to FIG. 2, there is shown a process 100 performed, under instructions from the controller 12, by the hybrid data storage system 10 for obtaining data from the primary storage system 14 and transferring the data to a suitable recording medium. The controller 12 can include a CPU, and can provide an interface between the hybrid data storage system and, for example, a WAN, at least one LAN, other storage systems, other memory systems, or combinations thereof. The controller 12 can be provided with data management software, and may also maintain one or more file directories for locating data files. In this embodiment the controller can be a hybrid holographic storage network-attached storage device or filer. Additionally, the storage system can contain multiple controllers, such as for optimizing process loads for writing and/or reading from separate devices in the hybrid storage system, and for other purposes that may further optimize performance of the hybrid storage system.

In a first step 102, the process 100 begins with the memory system 24 receiving data from the primary storage system 14. Then in a step 104, via the data buffers 42 and the cache devices 44, the memory system 24 transmits the data to the read/write holographic drive engine 26.

In a step 106, the read/write holographic drive engine 26 writes the data to a recording medium, such as a disk or a card, or any other suitable medium that is holographically writable. The medium either already exists in the read/write holographic drive engine 26 or the transfer mechanism-A 34 obtains the medium from the light-tight disk storage device 30, or obtains it contained in a light-tight storage device such as a cartridge, and transfers it to the read/write holographic drive engine 26.

Next in a decision step 108, the process 100 determines if the holographic recording medium is completed, that is, no additional data is to be written to the medium. If not, the medium remains with the read/write holographic drive engine 26 for future writing (identified as path A), or, in a step 109, the transfer mechanism-A 34 returns the medium to the light-tight storage device 30 (identified as path B), or returns it contained in a light-tight storage device such as a cartridge, in which case the medium would be transferred back to the read/write holographic drive engine 26 for future recording sessions.

If it is determined in the decision step 108 that the medium is completed, one of two paths may be taken. Either, in a step 110, the transfer mechanism-B 36 moves the medium from the read/write holographic drive engine 26 and transfers it to the non-light-tight storage device 32, or transfers it contained in a light tight storage device or non-light-tight storage device such as a cartridge, or, in a step 112, the transfer mechanism-D 34 directly transfers the completed medium from the read/write holographic drive engine 26 to the read only holographic drive engine 28. The transfer mechanism-C 38 is used to transfer the completed media back and forth between the read only holographic drive engine 28 and the non-light-tight storage device 32. Further, the transfer mechanism-E 41 can be used to transfer the holographic medium between the light-tight storage device 30 and the non-light-tight storage device 32.

When the medium resides in the read only holographic drive engine 28, the data is available for reading, in a step 114, to a client though the primary storage system 12, the WAN and/or LAN 16, the online storage system 18, the network attached storage system 19, the near-online storage 20, the SAN 21, and/or the offline storage system 22, and the like.

During the operation of the hybrid data storage system 10, the controller 12 may also function as an arbiter between the client and the hybrid data storage system 10. For instance, the controller may instruct the read/write holographic drive engine 26 to operate independently from the read only holographic drive engine 28. As an example, the read/write holographic drive engine 26 can be writing data on one disk, while the read only holographic drive engine 28 may be obtaining another disk from the non-light-tight storage device 32 and then read data from that disk to provide the data information to the client. Alternatively, the read/write drive engine and the read-only drive engine can be managed by separate controllers, such as for the purpose of providing separate I/O data streams.

The hybrid data storage system is not limited to the embodiments discussed above. For example, the hybrid data storage system 10 was described above as having a primary storage system. Alternatively, the data storage system 10 could be a stand alone storage system. For instance, the read/write holographic drive engine 26 and the read only holographic drive engine 28 could be part of, alone or in combination with the memory system 24, the light-tight storage device 30, the non-light-tight storage device 32, other storage systems 18, 19, 20, 21, or 22, or the like, and/or at least one digital video device (DVD) or arrangement of DVDs.

Figure 3:
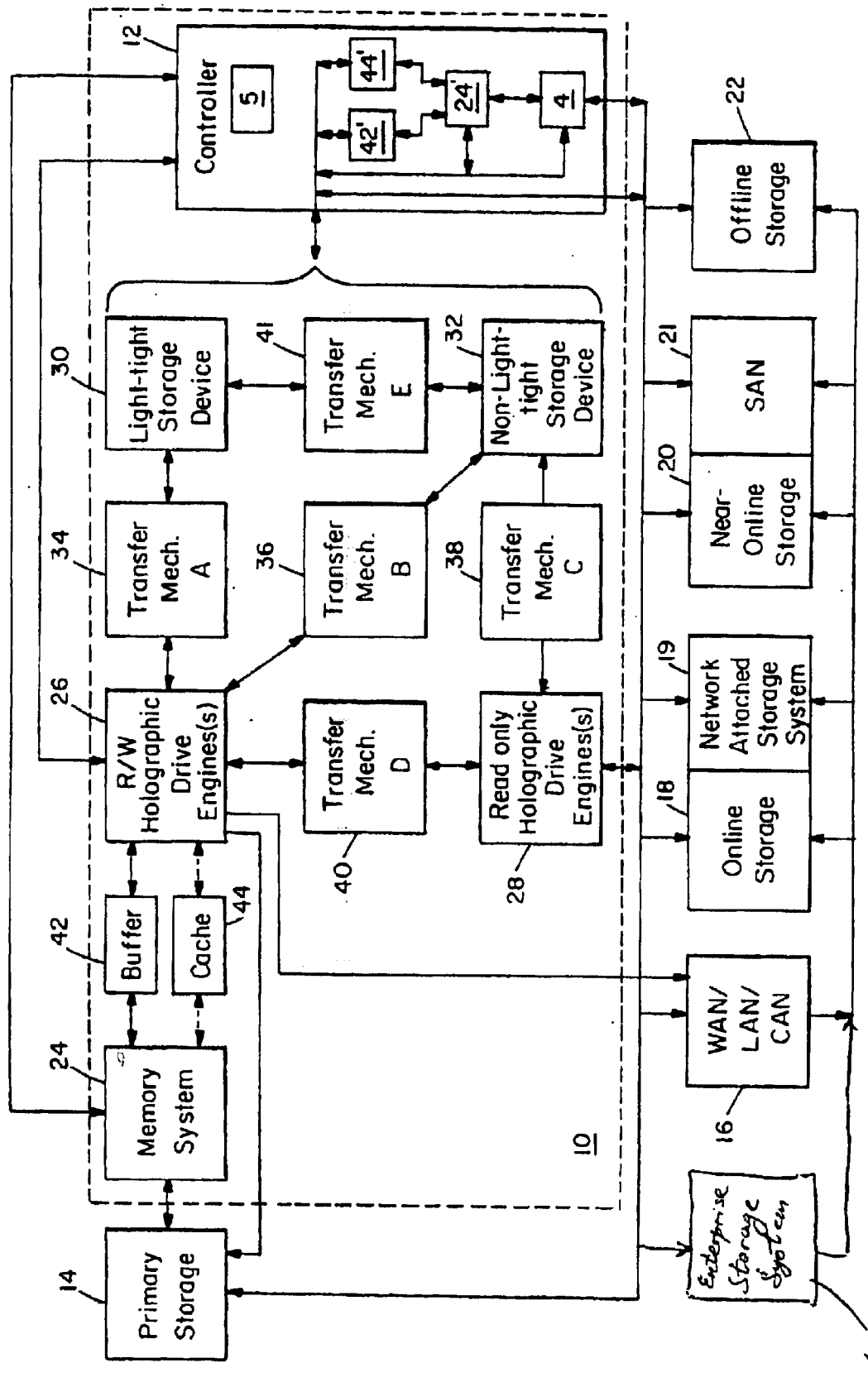
FIG. 3 is a block diagram of an alternative embodiment of a hybrid data storage system in accordance with the present invention.
Figure 4:
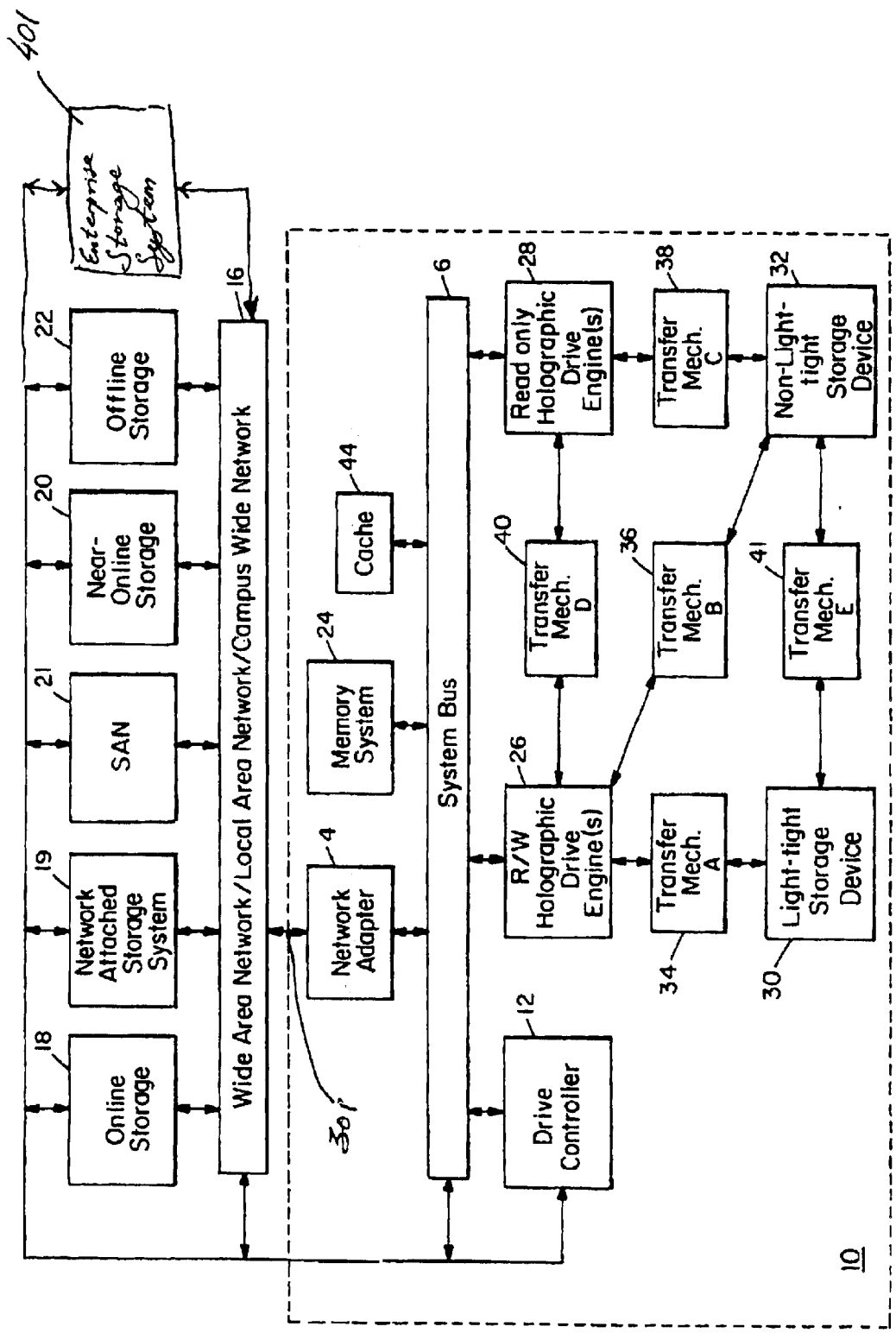
FIG. 4 is a block diagram of another alternative embodiment of a hybrid data storage system in accordance with the present invention.
Figure 5:
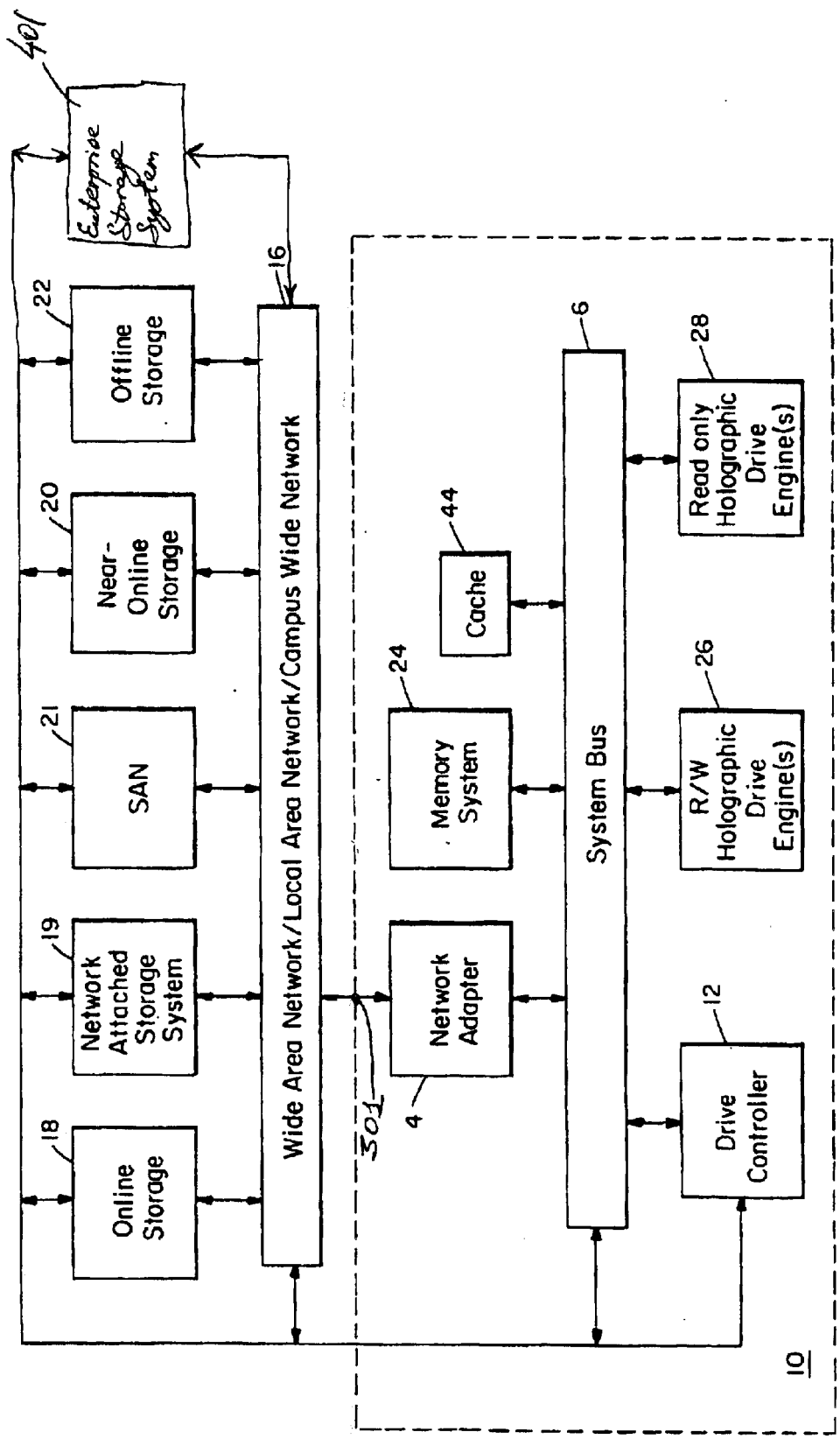
FIG. 5 is a block diagram of yet another alternative embodiment of a hybrid data storage system in accordance with the present invention.

In some embodiments the hybrid data storage system 10 includes a I/O controller, such that, for example, file management and network communication are performed by a controller on a network server, while in others, the controller 12 is part of the system 10 itself as shown, for example, in FIGS. 3–5 and provides further capabilities for processing and arbitration. In such arrangements, the controller 12, and hence the system 10, can receive information directly from, as well as transmit information to, something other than or in addition to the primary storage 14, such as, for example, the WAN and/or LAN 16, the online storage 18, the network storage system 19, the SAN 21, the near-online storage 20, and/or the offline storage 22, or any other suitable source or receptacle of information. Note that certain features of the storage system 10 shown in FIGS. 3–5 are the same as those described with reference to FIG. 1, and therefore are identified by like reference numerals. Also note that the controller 12 can be any of the types of controllers described in detail in "Building Storage Networks," by Marc Farley, Osborne/McGraw-Hill, 2000.

Referring in particular to FIG. 3, the controller 12 communicates directly with, or through a network interface card or adapter 4, the primary storage 14 or the online storage 18 or the network attached storage system 19 or the near-online storage 20 or the SAN 21 or the offline storage 22, or some combinations thereof. Optionally, the information from outside the system 10 can be transmitted to and from the controller 12 through the WAN and/or LAN 16. Furthermore, the controller 12 can communicate directly with the read/write holographic drive engine 26, the read only holographic drive engine 28, and/or the memory system 24 in certain embodiments.

As shown in FIG. 3, the controller 12 in one embodiment includes a CPU 5, one or more data buffers 42', one or more caches 44', and a memory system 24'. The function of the buffer 42' is similar to the buffer 42 discussed earlier. Accordingly, buffers 42' interfaces the memory system 24' to the R/W holographic drive engine 26. The data buffers 42' receives the data from the memory system 24' and then alters the format of the data, if needed, to make it suitably readable for the R/W holographic drive engine 26. That is, the data buffers 42' facilitate transferring the data to the read/write holographic drive engine 26 at a rate which the read/write holographic drive engine 26 is capable of reading and writing to a holographic recording medium. The data buffers 42' can be stand-alone units within the controller 12, or they can reside in the memory system 24'. Additionally or alternatively, as discussed earlier, the data buffers can reside in the R/W holographic drive engine 26.

The cache devices 44' are used in conjunction with the data buffers 42' to improve or substantially optimize the access to data from the memory system 24' to or from the R/W holographic drive engine 26. As with the data buffers 42', the caches may be separate physical units within the controller 12, or they may be logical units located in the memory system 24' or the R/W holographic drive engine 26, or both devices 24' and 26. The cache devices 44', independently or in conjunction with the data buffers 42', substantially optimize the delivery of the data to and from the read/write holographic drive engine 26.

As mentioned earlier, the controller 12 of the system 10 shown in FIG. 3 can facilitate the transmission of information from sources of information other than and in addition to the primary storage 14. As such, the hybrid data storage system 10 is interfaced through the controller 12, in a manner such as for a node, directly or through the WAN/LAN 16, to independently, one or more, or some combination of outside sources of information such as the online storage 18, the network attached storage system 19, the near-online storage 20, the SAN 21, and the offline storage 22. Other sources of information interfaced to the controller are also within the scope of this embodiment. The controller may additionally include a network adapter that can also be an adapter for interface to optical communications carried along optical fiber, through space, or using integrated optics, or combinations thereof, for wireless communications, and by way of example can communicate with Wide Area Network, Local Area Network, Campus Wide Network, online storage, near online storage, offline storage, network-attached storage or storage attached network (SAN) using such protocols as Integrated Drive Electronics (IDE), Small Computer System Interface (SCSI), Fibre Channel, Firewire, General Purpose Interface Bus (GPIB), Symmetric Digital Subscriber Line (SDSL), Asymmetric Digital Subscriber Line (ADSL), High-data-rate Digital Subscriber Line (HDSL), Integrated Services Digital Network (ISDN), Integrated Services Digital Network Primary Rate Interface (ISDN PRI), Digital Service level and framing specification for synchronous digital streams, such as over circuits in the North American digital transmissions hierarchy, at the T1 transmission rate of 1,544,000 bits per second (baud) (DS1), Digital Service level and framing specification for digital signals in the North American digital transmission hierarchy at T3 transmission rate of 44.736 Megabits per second (D53), Asynchronous Transfer Mode (ATM), International Telecomunications Union standards for the data network interface among control devices for home automation such as X10, for transmission of a DS1 formatted digital signal at 1.544 megabits per second (T1) for transmission of a DS3 formatted digital signal at 44.736 megabits per second (T3), Frame Relay (Data Terminal Equipment and Data Communication Equipment interface specification with addressing and control bits based on Link Access Protocol Balanced), Token Ring (computer local area network arbitration in which conflicts in the transmission of messages are avoided by the granting of "tokens" which give permission to send), Local Access and Transfer Area (LATA), Optical Carrier level xx (OCxx), Synchronous Transport Signal Levels level x (STS-x), Synchronous Optical NETwork (SONET), Copper Distributed Data Interface (CDDI), Fibre Distributed Data Interface (FDDI), and the like.

In another embodiment, there is shown in FIG. 4, the hybrid data system 10 communicating with the WAN and/or LAN 16 through the network adapter 4. Again, data is transferred between the WAN and/or LAN 16 and the online storage 18, the network attached storage system 19, the SAN 21, the near-online storage 20, and/or the offline storage 22. Other sources of information interfaced to the controller are also contemplated by this embodiment. Also in this embodiment, the network adapter 4 can serve as an adapter for interface to optical communications carried along optical fiber, through space, or using integrated optics, or combinations thereof, for wireless communications, and by way of example can communicate with protocols such as IDE, SCSI, Fiber Channel, Firewire, GPIB, IEEE, SDSL, ADSL, HDSL, ISDN, ISDN PRI, DS1, DS3, ATM, X10, T1, T3, Frame Relay, Token Ring, LATA, OCxx, STS-x, SONET, CDDI, EDDI, and the like. Similar to the embodiment shown in FIG. 1, holographic recording media are transferred amongst the holographic read/write drive engine 26, the read only drive engine 28, the light-fight storage device 30, and the non-light-tight storage device 32 through the use of the transfer mechanisms A, B, C, D, and E, identified by the reference numerals 34, 36, 38, 40, and 41, respectively.

However, unlike the hybrid data storage system 10 shown in FIG. 1, the storage system 10 of FIG. 4 includes a system bus 6 that facilitates direct transfer of data between the holographic read/write drive engine 26 and the read only drive engine 28, and transmits instructions from the drive controller 12 to the rest of the storage system 10 and data between the wide area network and/or local area network 16 and the storage system 10 through the network adapter card 4. Furthermore, the system bus 6 transmits data between the holographic read/write drive engine 26 and/or the read only drive engine 28 and the memory system 24 with or without the assistance of the cache 44.

In another embodiment, as illustrated in FIG. 5, communication between the right/write holographic drive engine 26 and the read only holographic drive engine 28 is entirely facilitated by the system bus 6 without the use of transfer mechanisms 34, 36, 38, 40, and 41 or light- and non-light-storage devices 30 and 32. However, the other features of the system 10 shown in FIG. 5 are identical to the system 10 of FIG. 4, as indicated by like reference numerals.

Note that the controller 12 of FIG. 4 or 5 can operate like the controller shown in FIG. 3. That is, the controller 12 of FIG. 4 or 5 can communicate directly with the WAN/LAN 16 and/or other sources of outside information. Again, the memory system, one or more cache devices, and/or one or more data buffers can reside in the controller 12 of FIG. 4 or 5, which can include a CPU 5. Thus, the system 10 of FIG. 4 or 5, like the system 10 of FIG. 3, can act as a node interfaced through the controller 12, directly or through the WAN/LAN 16, to some combination of outside sources of information, such as, for example the online storage 18, the network attached storage system 19, the near-online storage 20, the SAN 21, and the offline storage 22, or any other suitable source of information.

While this invention has been particularly shown and described with references to preferred embodiments thereof, it will be understood by those skilled in the art that various changes in form and details may be made therein without departing from the scope of the invention encompassed by the appended claims.

What is claimed is:

1. A hybrid data storage system, comprising:
at least one memory system; and
at least one holographic drive, data being transmitted between the holographic drive and the memory system,
wherein the at least one holographic drive writes data to a first holographic recording medium, and reads the written data from said first recording medium and from at least one other holographic recording medium.

2. The system of claim 1, further comprising a controller.

3. The system of claim 1, further comprising at least one read only holographic drive that receives the first or at least one other holographic recording medium after the data has been written in the first or at least one other holographic recording medium such that the read only drive reads the data from the first or at least one other holographic recording medium.

4. A hybrid data storage system, comprising:
a controller for communicating with an outside source of information; and
at least one holographic drive, that writes data to a first holographic recording medium, and reads the written data from said first recording medium and from at least one other holographic recording medium, the information being transmitted between the holographic drive and the controller,
wherein the outside source of information is an on-line storage, a near-on-line storage, an off-line storage, a network attached storage systems (NAS), one or more storage attached networks (SAN), an enterprise storage system or combinations thereof.

5. The system of claim 4, further comprising an interface for communicating with a wide area network (WAN) or one or more local area networks (LAN), the information being transmitted to or from the system to WAN or one or more LANs through the interface.

6. The system of claim 4, wherein the system is a node on a wide area network (WAN) or one or more local area networks (LAN).

7. The system of claim 4, further comprising an interface for communicating between the controller and the outside source of information, wherein the interface is a network adapter, a memory system, a cache or a combinations thereof.

8. A hybrid data storage system, comprising:
at least one memory system;
at least one read/write holographic drive, data being transmitted between the read/write holographic drive and the memory system, the read/write drive writing the data to a holographic recording medium; and
at least one read only holographic drive which, after the data has been written on the holographic recording medium, receives the medium such that the read only holographic drive reads the data.

9. The system of claim 8, further comprising at least one data buffer that interfaces or is part of an interface between the memory system and the read/write holographic drive.

10. The system of claim 9, wherein the data buffer is a separate device.

11. The system of claim 9, wherein the data buffer is a logical unit in the memory system.

12. The system of claim 9, wherein the data buffer is a logical unit in the read/write holographic drive.

13. The system of claim 8, further comprising at least one cache device that substantially optimizes the access of data by the memory system and the read/write holographic drive.

14. The system of claim 13, wherein the cache device is a separate device.

15. The system of claim 13, wherein the cache device is a logical unit in the memory system.

16. The system of claim 13, wherein the cache device is a logical unit in the read/write holographic drive.

17. The system of claim 8, further comprising a light-tight storage device that stores holographic recording media transferred to and from the read/write holographic drive.

18. The system of claim 17, further comprising a transfer mechanism that transfers the recording media between the read/write holographic drive and the light-tight storage device.

19. The system of claim 8, further comprising a non-light-tight storage device that stores holographic recording media transferred to or from the read/write holographic drive and the read only holographic drive.

20. The system of claim 19, further comprising a transfer mechanism that transfers the recording media between the read/write holographic drive and the non-light-tight storage device.

21. The system of claim 19, further comprising a transfer mechanism that transfers the recording media between the read only holographic drive and the non-light-tight storage device.

22. The system of claim 8, further comprising a transfer mechanism that transfers the recording media between the read/write holographic drive and the read only holographic drive.

23. The system of claim 8, wherein the memory system is at least one magnetic disk drive.

24. The system of claim 8, further comprising a transfer mechanism that transfers the recording medium between a light-tight storage device and a non-light-tight storage device.

25. The system of claim 8, wherein the memory system is at least one semiconductor memory device.

26. The system of claim 8, wherein the memory system is at least one magneto-optical recording device.

27. The system of claim 8, wherein the memory system is at least one tape drive device.

28. The system of claim 8, wherein the memory system is at least one video digital disk (DVD) device.

29. The system of claim 8, wherein the holographic recording medium is at least one holographic recording disk.

30. The system of claim 8, wherein the holographic recording medium is at least one holographic recording card.

31. The system of claim 8, further comprising a controller for controlling the operation of the hybrid data storage system.

32. The system of claim 8, further comprising a controller that provides an interface between the hybrid data storage system and a WAN, or at least one LAN, or at least other storage system, or combinations thereof.

33. The system of claim 32, further comprising an interface that is a network adapter, which additionally serves as an adapter for optical communications carried along optical fiber or through space.

34. The system of claim 33, wherein the network adapter communicates with a WAN or at least one LAN by a protocol selected from the group consisting IDE, SCSI, Fiber Channel, Firewire, GPIB, SDSL, ADSL, HDSL, ISDN, ISDN PRI, DS1, DS3, ATM, X10, T1, T3, Frame Relay, Token Ring, LATA, OCxx, STS-x, SONET, CDDI, and FDDI.

35. A method of storing and accessing data, comprising:
transmitting data between at least one memory system and at least one holographic drive,
wherein the at least one holographic drive writes data to a first holographic recording medium, and reads the written data from said first recording medium and from at least one other holographic recording medium.

36. The method of claim 35, further comprising writing data to a holographic recording medium with at least one holographic drive.

37. The method of claim 35, further comprising writing data to a first holographic recording medium and reading the data from the first recording medium with at least one holographic drive.

38. The method of claim 35, further comprising writing data to a first holographic recording medium and reading the data from the first recording medium and from at least one other holographic recording medium with at least one holographic drive.

39. A method of storing and accessing data, comprising:
transmitting information between an outside source of information and a holographic drive,
wherein the holographic drive writes data to a first holographic recording medium, and reads the written data from said first recording medium and from at least one other holographic recording medium.

40. The method of claim 39, wherein transmitting information includes receiving information by a controller from an on-line storage, a near-on-line storage, or an off-line storage, a network attached storage systems (NAS), a storage attached networks (SAN), an enterprise storage system, or at least one other storage system or a combination thereof.

41. The method of claim 40 wherein the controller receives or transmits information to and from a WAN, or at least one LAN, or at least one other storage system or a combination thereof.

42. The method of claim 40 wherein the controller is an arbiter for storing and accessing data.

43. The method of claim 39, further comprising receiving information through an interface to a wide area network (WAN) or one or more local area networks (LAN).

44. The method of claim 39, further comprising distributing information through an interface to a wide area network (WAN) or one or more local area networks (LAN).

45. A method of storing and accessing data, comprising:
receiving the data from a memory system with at least one a read/write holographic drive, and writing the data to a holographic recording medium with the read/write holographic drive;
after the data has been written on the holographic recording medium, transferring the holographic recording medium to a read only holographic drive; and
reading the data from the holographic recording medium with the read only holographic drive.

46. The method of claim 45, further comprising interfacing the memory system with the read/write holographic drive through at least one data buffer.

47. The method of claim 45, further comprising substantially optimizing the access of data by the memory system and the read/write holographic drive with at least one cache device.

48. The method of claim 45, further comprising storing holographic recording media transferred to and from the read/write holographic drive in a light-tight storage device.

49. The method of claim 45, further comprising storing holographic recording media transferred to and from the read/write holographic drive and the read only holographic drive in a non-light-tight storage device.

50. The method of claim 49, further comprising transferring the recording media between the read only holographic drive and the non-light-tight storage device.

51. The method of claim 49, further comprising transferring the recording media between the read/write holographic drive and the non-light-tight storage device.

52. The method of claim 45, further comprising transferring the recording media between the read/write holographic drive and the read only holographic drive.

53. The method of claim 45, further comprising transferring the recording medium between a light-tight storage device and a non-light-tight storage device.

54. The method of claim 45, wherein the steps are performed under the direction of a controller that optionally comprises a CPU, at least one data buffer, at least one cache, a memory system, a network adapter or a combination thereof.

55. The method of claim 45, wherein storing and accessing data includes receiving information by a controller from an on-line storage, a near-on-line storage, an off-line storage, a network attached storage systems (NAS), a storage attached networks (SAN), an enterprise storage system, or at least one other storage system or a combination thereof.

56. The method of claim 55 wherein the controller receives or transmits information to and from a WAN, or at least one LAN, or at least one other storage system or a combination thereof.

57. The method of claim 55 wherein the controller is an arbiter for storing and accessing data.

58. A hybrid data storage system, comprising:
   at least one memory system;
   a light-tight storage device for storing non-complete holographic recording medium;
   a non-light-tight storage device for storing completed holographic recording medium;
   at least one read/write holographic drive for writing to and reading from the non-completed holographic recording medium, data being transmitted between the read/write holographic drive and the memory system; and
   at least one read only holographic drive for reading the data from a completed holographic recording medium.

59. The system of claim 58, further comprising:
   a first transfer mechanism for transferring the non-completed holographic recording medium between the at least one read/write holographic drive and the light-tight storage device;
   a second transfer mechanism for transferring the completed holographic recording medium between the at least one read/write holographic drive and the non-light-tight storage device;
   a third transfer mechanism for transferring the completed holographic recording medium between the non-light-tight storage device and the at least one read only holographic drive;
   a fourth transfer mechanism for transferring the completed holographic recording medium between the at least one read/write holographic drive and the at least one read only drive; and
   a fifth transfer mechanism for transferring the completed holographic recording medium between the light-tight storage device and non-light-tight storage device.

60. The system of claim 58, further comprising:
   a transfer mechanism for transferring media to and from any of the at least one read/write drive, at least one the read only holographic drive, the light-tight storage device and the non-light-tight storage device.

* * * * *

UNITED STATES PATENT AND TRADEMARK OFFICE
CERTIFICATE OF CORRECTION

PATENT NO.         : 6,904,491 B2                                     Page 1 of 1
APPLICATION NO. : 10/116684
DATED              : June 7, 2005
INVENTOR(S)        : David A. Waldman, Richard T. Ingwall and M. Glenn Horner It is certified that error appears in the above-identified patent and that said Letters Patent is hereby corrected as shown below:

Column 10
Line 2, delete the ","
Line 15, delete "WAN" and insert -- the WAN --

Column 12
Line 5, delete "or an off-line" and insert -- an off-line --
Line 23, delete the ","

Signed and Sealed this

Twenty-eighth Day of August, 2007

JON W. DUDAS
*Director of the United States Patent and Trademark Office*